Nov. 23, 1954 A. C. PECK ET AL 2,695,216
METHOD OF OPERATING A NITROGEN FIXATION FURNACE
Filed April 29, 1950
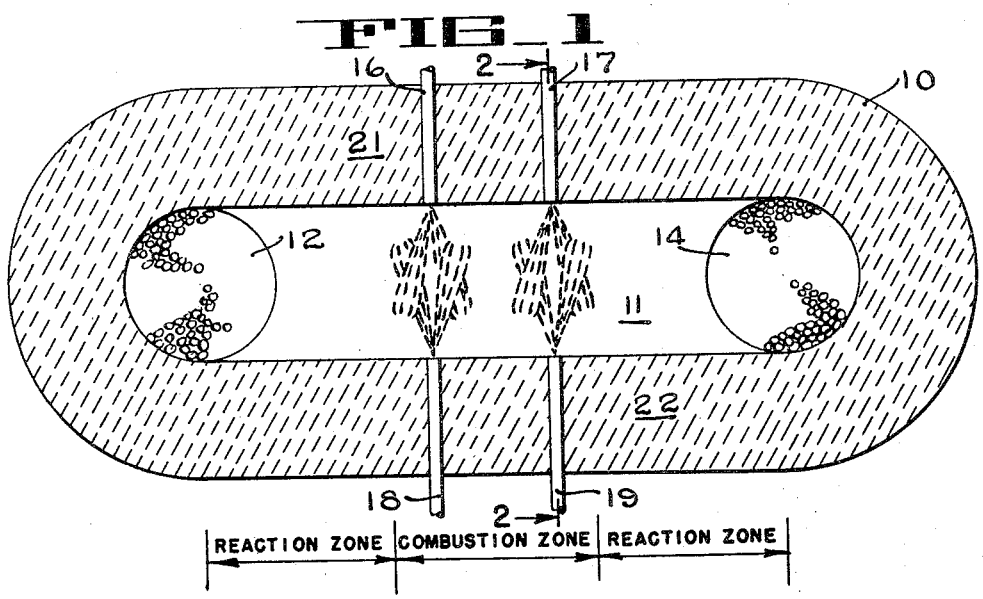
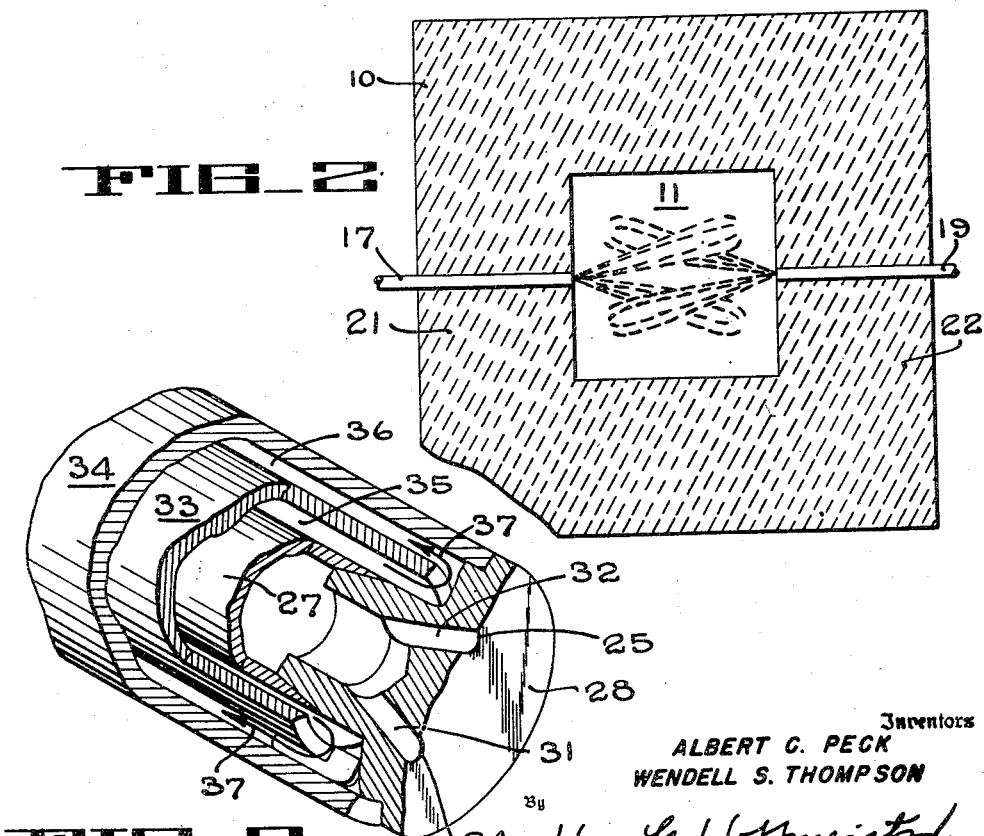
Inventors
ALBERT C. PECK
WENDELL S. THOMPSON
By Hans G. Hoffmeister
Attorney

United States Patent Office 2,695,216
Patented Nov. 23, 1954

2,695,216

METHOD OF OPERATING A NITROGEN FIXATION FURNACE

Albert C. Peck and Wendell S. Thompson, Los Gatos, Calif., assignors to Food Machinery and Chemical Corporation, San Jose, Calif., a corporation of Delaware Application April 29, 1950, Serial No. 159,108

4 Claims. (Cl. 23—163)

The present invention relates to the art of burning fluid fuels in furnaces that are employed to sustain high temperature reactions, such as the processes for the thermal fixation of atmospheric nitrogen which require temperatures of the order of 2000° C.

Nitrogen fixation processes and similar high temperature reactions are most economically performed in regenerative furnaces of the pebble bed type. Such furnaces have beds of refractory pebbles that control entrance to and exit from the combustion zone and they comprise means for periodically reversing the direction in which they are operated so that each pebble bed is successively transversed by the effluent reaction gases and the entrant air supply. Thus, the pebbles in each bed alternately absorb heat from the hot reaction gases and transmit it to the entrant air supply. In this manner the heat generated in the combustion zone of the furnace is conserved in a high measure and materially higher temperatures may be established in the combustion zone of the furnace than ordinarily obtainable with the fuels employed.

In the practical performance of nitrogen fixation processes in furnaces of the type described it was observed that the nitrogen oxide yield actually obtained remained usually substantially below the yield that could theoretically be expected. Additionally it was found that the period over which the process could uninterruptedly be continued was severely limited by premature deterioration of the refractory constituents of the furnace which increased the cost of the nitrogen oxides produced to an extent that threatened the economic feasibility of the process.

The causes for these defects were investigated and it was found that they could largely be traced to improper combustion of the fluid fuels fed into the furnace. For proper combustion the fuel delivered into the furnace must very rapidly be mixed with adequate amounts of the air entering the combustion zone through one or the other of the pebble beds so as to achieve rapid and complete oxidation of the fuel gases. In practical operation it was found, however, that due to improper mixing of the injected fuel with the air sweeping through the furnace, free carbon was formed by decomposition of the fuel which interfered with the desired nitrogen fixing reaction and/or reduced newly formed nitrogen oxide. Moreover, at the extremely high temperatures prevailing in the furnace such free carbon reduced the refractory constituents of the furnace wherever it reached the furnace walls or the pebble beds and in this manner caused premature deterioration of the furnace structure.

It is an object of our invention to provide a method of delivering a fluid fuel into a confined space containing a combustion-sustaining atmosphere, such as air, which accomplishes extremely rapid and thorough mixing of said fuel with adequate amounts of said atmosphere.

Another object is to provide a method of delivering a fluid fuel into a nitrogen fixation furnace in a manner adapted to cause such rapid and complete combustion of said fuel that practically no carbon is ever available to reduce either the nitric oxides present in the reaction zone or any of the refractory constituents of the furnace.

Even if complete and rapid combustion of the injected fuel is obtained, however, the yield of nitrogen oxides actually obtained may still remain below the yields that may theoretically be expected. The causes for this deficiency in the practical performance of the described nitrogen fixation process may again be found in the manner in which the fluid fuel is burned in the furnace, for the requirements for establishing such conditions within the combustion chamber of a nitrogen fixation furnace as will secure maximum productivity are numerous and complex. Thus, on the one hand it is desirable that the actual heat-producing combustion of the fuel within the combustion chamber be confined to a clearly defined flame zone of limited compass so as to leave a clearly defined and adequately large space in said combustion chamber for the desired nitrogen fixation reaction to occur without interference from the fuel-combustion process. On the other hand, the formation of a specially limited locus of extreme heat amidst an environment of relatively cooler air inhibits the desired nitrogen fixation reaction since the heat of said combustion locus must first be transmitted to the surrounding air before oxidation of the nitrogen contained in said air may effectively commence.

It is another object of our invention, therefore, to provide a method of delivering fluid fuels into a furnace, of the type referred to, which insures rapid and complete combustion of said fuel within a clearly defined space of limited compass, and is yet effective to heat all the air passing through the combustion zone of the furnace rapidly and uniformly to the maximum temperature obtainable within said furnace.

An additional object is to provide a method of delivering fluid fuels into, and burning them within, the combustion chamber of a nitrogen fixation furnace, which causes all the available air to be uniformly mixed with the reaction products of the combustion process.

To derive fullest advantage from the combustion process maintained in a nitrogen fixation furnace it is important that the actual reaction zone between the end of the flame zone and the pebble bed acting as chilling medium at the moment will not be longer than absolutely necessary for the completion of the desired nitrogen fixing reaction, in order to hold any loss of heat from the reaction gases to the relatively cool furnace wall at a minimum, for any such loss of heat would lower the effective reaction temperature and thus reduce the concentration of nitrogen oxides in the reaction zone.

It is yet another object of our invention, therefore, to provide a method of delivering fluid fuels into a furnace, of the type referred to, that is not only productive of a clearly defined flame zone, but provides control of the physical dimensions of said flame zone.

More specifically, it is an object to provide a method of delivering fluid fuels into a nitrogen fixation furnace that is not only productive of a clearly defined flame zone, but which will also establish a clearly defined reaction zone of optimum size and location so that the newly formed nitrogen oxides are immediately subjected to the stabilizing effect of whatever pebble bed acts as chilling medium at the moment.

These and other objects of our invention will be apparent from the following description of the accompanying drawings which illustrate a preferred embodiment thereof and wherein:

Figure 1 is a schematic showing of a horizontal section through a pebble bed furnace that is operated in accordance with our invention.

Figure 2 is a vertical cross-section through said furnace taken along line 2—2 of Figure 1, and viewed in the direction of the arrows associated with said line.

Figure 3 is a fragmentary perspective of the injection nozzle formed at the inner end of the fuel injection tubes illustrated in Figures 1 and 2.

The invention is based upon the observation that fluid fuels may be injected for combustion into a combustion-sustaining atmosphere, such as air, at such high velocities as will rapidly aspirate grossly excessive amounts of said atmosphere and as would normally prevent maintenance of a flame, and yet will burn rapidly and completely if said atmosphere is at a temperature above the auto-ignition temperature of the fuel. In accordance with the invention we inject fluid fuel into the combustion chamber of a nitrogen fixation furnace at such velocities as will cause continual aspiration of substantially all the air entering said chamber through one or the other of the pebble beds which will usually require at least sonic injection velocities. In this manner all the available air is continually brought into intimate contact with the combustion flame and is, therefore, rapidly and uniformly heated to the maximum temperature obtained in the furnace.

The invention is further based upon the discovery that the length of a flame resulting from high velocity injection of fluid fuel into a confined combustion sustaining atmosphere heated above the auto-ignition point of the fuel is a direct function of the diameter of the injection orifice, and may be controlled by properly dimensioning the diameter of the injection orifice. In accordance with our invention we inject fluid fuel into the combustion chamber of a furnace traversed by a stream of air heated to temperatures at or above the auto-ignition point of said fuel at such a high velocity as will continually aspirate substantially all the air contained in said air stream and we effect said fuel injection through orifices of such small diameter as will keep the ends of the resultant flames away from any refractory surfaces of the combustion chamber, the inflow of fuel required to maintain the necessary reaction temperature within the furnace being secured by providing the appropriate number of fuel injection orifices and/or increasing the injection pressure.

Thus, by injecting fluid fuel with sufficient pressure into the combustion chamber of a nitrogen furnace we cause continuous aspiration of all the preheated air, sweeping through the furnace, into the flame zone and in this manner heat all the air available for the nitrogen fixation reaction uniformly and with utmost rapidity to the maximum temperature obtainable in the furnace. Furthermore, by appropriate predetermination of the size, number and location of the injection orifices we are able to secure a clearly defined and evenly distributed flame zone of desired compass that is dependably kept apart from the refractory surfaces of the furnace, and we are also able to establish clearly defined reaction zones of optimum compass between the flame zone and the pebble beds of the furnace. Thus, when a nitrogen furnace is operated in accordance with our invention, the desired nitrogen fixation reaction may commence as rapidly as possible and may proceed uniformly and at maximum efficiency over the total space of the reaction zones established between the flame zone and the pebble beds without the appearance of harmful hot spots or steaks and without leaving regions of lower temperature that may fail to partake in the nitrogen fixation reaction.

The nitrogen fixation furnace diagrammatically illustrated in Figures 1 and 2 comprises an enclosure 10 made of refractory material such as magnesium oxide, which surrounds a combustion chamber 11 of oblong shape. Entrance to and exit from said combustion chamber 11 is controlled by a pair of vertical passages 12 and 14, respectively, which are located at opposite ends of the combustion chamber and which are filled with pebbles of suitable size and material such as pebbles of magnesium oxide ranging in size from ⅜ to ¾ of an inch. During operation of the furnace air is supplied to the combustion chamber 11 through one of the passages 12, 14 and the hot combustion products are allowed to escape from said chamber through the opposite passage and transmit most of their heat to the pebbles contained therein. By reversing the direction of operation of the furnace at predetermined intervals such that the air enters the combustion chamber through pebbles that have been heated by contact with the hot combustion products during the directly preceding cycle in the operation of the furnace, the air supply may readily and economically be heated to temperatures materially greater than the auto-ignition point of the fluid fuel employed in the operation of the furnace, such as temperatures of the order of 2200° C.

In practically operating a nitrogen fixation furnace of the type illustrated in Figures 1 and 2 and wherein the combustion chamber was about 24" high and 24" wide and had a length of about 90" (measured from center point to center point of the pebble beds 12 and 14) the amount of air delivered into the furnace was about 10 cubic feet per second. The fuel employed to heat the furnace was a natural gas consisting of approximately 85% of methane and 15% of ethane and having a net heating value of about 980 B. t. u. per standard cubic foot. In accordance with the invention said fuel was injected into the furnace in a direction normal to the passage of the air supply through 8 injection apertures each about .040" in diameter under a pressure of about 100 pounds per square inch resulting in injection jets that entered the combustion chamber at a speed of about 1500 feet per second and which introduced into said combustion chamber a total amount of .42 cubic feet of the fuel per second. For this purpose four tubular conduits 16, 17, 18 and 19 were arranged to extend horizontally through the side walls 21 and 22 of the refractory furnace enclosure 10, two on each side as shown in Figure 1, and each of said tubular conduits was constructed to form at its inner end two separate fuel injection apertures 24 and 25 of the required size of .040", as shown in Figure 3. Having specific reference to said Figure 3, each of said fuel supply conduits comprised a center pipe 27 that conducted the fuel, and the inner end of said pipe 27 was closed by a metal plug 28 within which were formed two outwardly diverging channels 31 and 32 that terminated in the above mentioned fuel injection apertures 24 and 25, respectively. Arranged concentrically around each pipe 27 were two tubular jackets or shells 33 and 34 having sufficiently different diameters to form two concentrically superposed annular passages 35 and 36 through which cooling water was continuously circulated during operation of the furnace in the direction of the arrows 37. The four fuel supply conduits 16, 17, 18 and 19 were mounted within the furnace enclosure 10 in such angular positions as to place the two fuel injection apertures 24 and 25 of each tube within a plane slanting at an angle of 45 degrees, with the injection apertures of each two oppositely positioned fuel conduits 16, 18 and 17, 19 situated in oppositely slanting planes so as to cause the diverging fuel injection jets formed at the ends of each two oppositely positioned tubes, during operation of the furnace, to straddle each other, as indicated in Figure 1.

With the fuel injected through the eight injection apertures of the conduits 16, 17, 18 and 19 under the above mentioned pressure of 100 pounds per square inch, four pairs of diverging fuel injection jets were formed within the combustion chamber that aspirated all the air entering said chamber through one or the other of the pebble beds; and due to the high temperature of said air and the small diameter of the injection orifices, the fuel introduced in said jets was burned completely before the gas streams reached the opposite wall of the combustion chamber and therefore no unburnt carbon reached any of the refractory surfaces of the furnace. By effecting combustion of the injected fuel in such short flames; i. e., flames of a length smaller than the width of the combustion chamber, and by arranging the injection orifices in the described manner to produce the interlocking flame pattern illustrated in Figure 1, within the center region of the combustion chamber, a clearly defined flame zone was established within said combustion chamber that left at either side a clearly defined reaction zone of optimum size and location relative to the pebble bed regenerators 12 and 14, as marked out at the bottom of Figure 1. The temperature of the gaseous medium in the furnace maintained by the described combustion process was of the order of 2300° C., and by aspirating the total air supply continuously into the fuel injection jets, the total amount of air passing through the reaction zone was continuously heated with utmost rapidity to said temperature without the formation of harmful hot streaks or underheated pockets so that the desired nitrogen fixing reaction occurred always uniformly and at maximum efficiency over the total space between the end of the flame zone and the particular pebble bed regenerator acting as chilling medium at the moment. In consequence thereof near theoretical yields of nitrogen oxides were obtained over extended periods of time.

Thus, in accordance with our invention as described hereinbefore, we are able to deliver fluid fuels into a nitrogen fixation furnace with fuel injection means of extremely simple construction that are not subject to clogging and expose a minimum of water-cooled surface to the radiant heat of the furnace, and maintain said furnace at maximum efficiency over extended periods of time without undue deterioration of the furnace or decline of its yield.

While we have explained our invention with particular emphasis upon its application to nitrogen fixation furnaces, it will be understood that its utility is not limited to such furnaces and that the invention may be used to advantage in connection with other furnaces sustaining high temperature reactions.

We claim:
1. A method of operating a nitrogen fixation furnace to obtain a high yield of nitrogen oxides, which comprises forcing a mixture of nitrogen and oxygen through the combustion zone of the furnace; pre-heating said mixture prior to entrance into the combustion zone to a temperature above the auto-ignition point of the fuel employed; injecting a gaseous fuel into the pre-heated mixture, as it passes through the combustion zone, with a velocity at least equal to the velocity of sound in the fuel employed at standard temperature and pressure, so as to effect aspiration of such grossly excessive amounts of said mixture into the resultant fuel injection jet as would normally prevent combustion of the fuel; and subjecting the resultant combustion products to rapid chilling to obtain nitrogen oxides in stable form.

2. The method according to claim 1 wherein said mixture of nitrogen and oxygen is air.

3. The method of operating a nitrogen fixation furnace having a combustion zone defined by refractory surfaces, so as to obtain a high yield of nitrogen oxides; which comprises forcing a mixture of nitrogen and oxygen through said combustion zone; pre-heating said mixture prior to its entrance into said combustion zone to a temperature above the auto-ignition point of the fuel employed; injecting a gaseous fuel into the pre-heated mixture, as it passes through said combustion zone, with a velocity at least equal to the velocity of sound in the fuel employed at standard temperature and pressure, so as to effect aspiration of such grossly excessive amounts of said mixture into the resultant fuel injection jet as would normally prevent combustion of the fuel; effecting the injection of said fuel through an orifice of such fineness as to cause complete combustion of the fuel contained in the fuel injection jet before said jet reaches the refractory surface opposite the fuel injection point; and subjecting the resultant combustion products to rapid chilling so as to obtain nitrogen oxides in stable form.

4. The method according to claim 3 wherein said mixture of nitrogen and oxygen is air.

References Cited in the file of this patent

UNITED STATES PATENTS

| Number | Name | Date |
|---|---|---|
| 834,257 | Brunler | Oct. 30, 1906 |
| 1,011,014 | Bender | Dec. 5, 1911 |
| 2,000,580 | Carruthers | May 7, 1935 |
| 2,095,065 | Hays | Oct. 5, 1937 |
| 2,206,552 | Nagel | July 2, 1940 |
| 2,215,080 | Hess | Sept. 17, 1940 |
| 2,401,836 | McManus | June 11, 1946 |
| 2,421,744 | Daniels et al. | June 10, 1947 |
| 2,422,081 | Cottrell | June 10, 1947 |
| 2,462,026 | Loving | Feb. 15, 1949 |
| 2,512,259 | Pike | June 20, 1950 |
| 2,548,002 | Daniels | Apr. 10, 1951 |
| 2,625,463 | Norton | Jan. 13, 1953 |

FOREIGN PATENTS

| Number | Country | Date |
|---|---|---|
| 18,475 | Great Britain | of 1910 |
| 104,734 | Great Britain | Mar. 15, 1917 |
| 390,849 | Great Britain | Apr. 5, 1933 |
| 458,692 | Great Britain | Dec. 24, 1936 |

OTHER REFERENCES

Gilbert et al., "Fixation of Atmospheric Nitrogen in a Gas Heated Furnace," Ind. and Eng. Chem., September 1948, pages 1719–1723.